United States Patent [19]
Imura

[11] Patent Number: 5,812,886
[45] Date of Patent: Sep. 22, 1998

[54] MOTION COMPENSATION DEVICE WHICH IMMEDIATELY RESUMES MOTION COMPENSATION AFTER COMPLETION OR INTERRUPTION OF A MOTION COMPENSATION PROCESS

[75] Inventor: Yoshio Imura, Kawasaki, Japan

[73] Assignee: Nikon Corporation, Tokyo, Japan

[21] Appl. No.: 901,953

[22] Filed: Jul. 29, 1997

[30] Foreign Application Priority Data

Jul. 30, 1996 [JP] Japan ..................................... 8-200238

[51] Int. Cl.$^6$ ....................................................... G03B 5/00
[52] U.S. Cl. ................................................................ 396/55
[58] Field of Search .............................. 396/55; 348/208; 359/554

[56] References Cited

U.S. PATENT DOCUMENTS

| | | | |
|---|---|---|---|
| 4,731,669 | 3/1988 | Hayashi et al. | 348/208 |
| 5,117,246 | 5/1992 | Takashi et al. | 396/55 |
| 5,153,633 | 10/1992 | Otani | 396/55 |
| 5,181,056 | 1/1993 | Noguchi et al. | 396/55 |
| 5,633,756 | 5/1997 | Kameda et al. | 359/554 |

FOREIGN PATENT DOCUMENTS

| | | |
|---|---|---|
| 0 540 046 A3 | 5/1993 | European Pat. Off. . |
| 6-067246 | 3/1994 | Japan . |

*Primary Examiner*—W. B. Perkey

[57] ABSTRACT

A motion compensation device, suitable for use in a camera, which can immediately resume a motion compensation process after the interruption of the motion compensation process or the completion of a previous motion compensation process. The motion compensation device includes a motion compensation optical system which is driven by a drive member to compensate for detected motion. A motion compensation control device controls a drive device to drive the motion compensation optical system to compensate for detected motion in response to a motion compensation start signal generated by a motion compensation start signal generation device. The motion compensation control device controls a fastening member to fasten the motion compensation optical system in response to a motion compensation stop signal generated by the motion compensation stop signal generation device. The motion compensation control device controls the drive device to hold at a stand-by position for a specified period of time until the fastening of the motion compensation optical system begins.

18 Claims, 6 Drawing Sheets

MOTION COMPENSATION DEVICE WHICH IMMEDIATELY RESUMES MOTION COMPENSATION AFTER COMPLETION OR INTERRUPTION OF A MOTION COMPENSATION PROCESS

CROSS REFERENCE TO RELATED APPLICATIONS

This application is based upon and claims priority from Japanese Patent Application No. 8-200238 filed Jul. 30, 1996, the contents of which are incorporated herein by reference.

BACKGROUND OF THE INVENTION

1. Field of the Invention

The present invention is related to a motion compensation device, suitable for use in a camera, to compensate for image blur caused by motion of an image forming optical system, and, more particularly, the present invention is related to a motion compensation device having a fastening device for fastening a motion compensation optical system at a specified position and which immediately resumes a motion compensation operation after completion or interruption of the motion compensation process.

2. Description of the Related Art

Image blur suppression devices have as their object, suppression of, or reduction of, blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

Camera motion compensation devices to compensate for image blur caused by camera motion are known. For example, Japanese Laid-open Patent Publication No. H5-150194 discloses a motion compensation device having a compensation lens, a lens frame body to hold the motion compensation lens, a drive mechanism to drive the lens frame body, a fastening member to fasten the lens frame body, and a voice coil motor to hold the lens frame body at a specified position. Further, the voice coil motor not only facilitates the fastening member to hold the lens frame body at a specified position, but also facilitates holding the lens from body so that it is not displaced from the specified position due to gravity.

The camera motion compensation device described in Japanese Laid-open Patent Publication No. H5-150194 fastens the lens frame body with the fastening member at approximately the same time as the lens frame body is held at the specified position by the voice coil motor. When the fastening of the lens frame body by the fastening member is released, the voice coil motor maintains the lens frame body at the specified position at the time of the fastening release action, and the motion compensation process subsequently begins. Hence, the motion compensation device described in Japanese Laid-open Patent Publication No. H5-150194 can not resume the motion compensation process immediately after a motion compensation operation is performed.

Further, another conventional motion compensation device to compensate for image blur is disclosed in Japanese Laid-open Patent Publication No. H6-67246 which discloses a motion compensation device having a motion compensation lens, a lens frame body to hold the motion compensation lens, a drive mechanism to drive the lens frame body, and a fastening member to fasten the lens frame body. The fastening member includes a protrusion which can be freely engaged with a groove formed on the lens frame body. When a camera motion compensation process is not performed, the protrusion is engaged with the groove and the fastening member fastens the lens frame body at a specified position.

When a motion compensation process is begun with the motion compensation device in the state with the fastening member fastening the lens frame body, the fastening member releases the lens frame body and the drive mechanism drives the lens frame body to a center position of the motion compensation lens. Subsequently, the lens frame body is moved from the center position by the drive mechanism, and the motion compensation lens begins the motion compensation process. When the motion compensation process is completed or interrupted, the fastening member fastens the lens frame body at the specified position.

The camera motion compensation device described in Japanese Laid-open Patent Publication No. H6-67246 first releases the fastening of the lens frame body when the motion compensation process is resumed after the completion or interruption of the motion compensation process. Then, the lens frame body is driven to the center position. As a result of releasing and centering the lens frame body, the prior art camera motion compensation device requires a certain period of time to release the fastening of the lens frame body, as well as another period of time to drive the lens frame body to the center position. Therefore, the prior art motion compensation device is unable to immediately resume the motion compensation process.

Furthermore, in operation of the camera motion compensation device described in the Japanese Laid-open Patent Publication No. H6-67246, the fastening member fastens the lens frame body at a specified position each time an exposure is completed. The fastening of the lens frame body at the specified position occurs even when an exposure is repeated immediately following a previous exposure. As a result, it is necessary for the prior art camera motion compensation device to release the fastening of the lens frame body, to drive the lens frame body to the center position, and to start and finish the motion compensation process from the center position, thereby resulting in a possibility of missing a shutter-release opportunity.

SUMMARY OF THE INVENTION

It is an object of the present invention to provide a motion compensation device, suitable for use in a camera, which overcomes the above-noted problems of the prior art and immediately resumes motion compensation after the completion or interruption of the motion compensation process.

It is another object of the present invention to provide a motion compensation device, suitable for use in a camera, which can immediately resume a motion compensation operation after an exposure, and which enables an exposure while performing camera motion compensation.

Additional objects and advantages of the invention will be set forth in part in the description which follows, and, in part, will be obvious from the description, or may be learned by practice of the invention.

Objects and advantages of the present invention are achieved in accordance with embodiments of the present invention with a motion compensation device, suitable for use in a camera, comprising a motion detection device to detect motion and to output motion detection information; a motion compensation optical system to compensate for the detected motion; a drive device to drive the motion compensation optical system; a fastening member to fasten the motion compensation optical system; a motion compensation start signal generation device to generate a motion compensation start signal; a motion compensation stop signal generation device to generate a motion compensation stop signal; and, a motion compensation control device to control the drive device to drive the motion compensation optical system according to the motion detection information based on the motion compensation start signal, and to control the fastening member to fasten based on the motion compensation stop signal. The motion compensation control device controls the drive device to hold the motion compensation optical system at a stand-by position during a specified period of time until the fastening of the motion compensation optical system is begun.

In accordance with embodiments of the present invention, the motion compensation control device controls the drive device to drive the motion compensation optical system from the stand-by position based on the motion detection information when the motion compensation start signal is re-entered within a specified period of time.

In accordance with embodiments of the present invention, the motion compensation control device sets the approximate center of a drive range for the motion compensation optical system as the stand-by position.

In accordance with an embodiment of the present invention, the motion compensation control device sets, as the specified period of time, a mean time from the time when the motion compensation stop signal is entered until the time when the motion compensation start signal is re-entered.

In accordance with an embodiment of the present invention, the motion compensation control device sets the specified period of time at an optional time.

In accordance with embodiments of the present invention, the motion compensation start signal generation device generates the motion compensation start signal based on at least one of an ON signal from a photographing ready switch and an ON signal from a photographic operation switch.

In accordance with embodiments of the present invention, the motion compensation stop signal generation device generates the motion compensation stop signal based on at least one of an OFF signal of the photographing ready switch, an OFF signal of the photographic operation switch, and an exposure completion signal.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
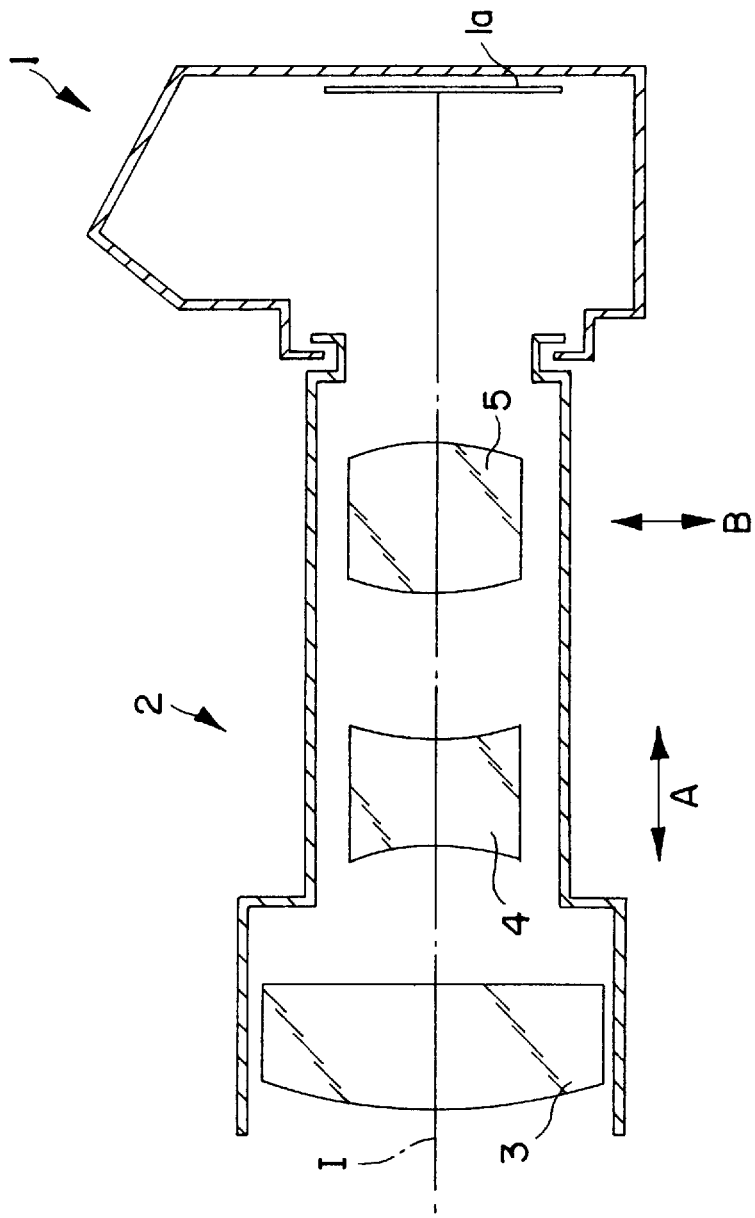
FIG. 1 is a cross sectional view showing an outline of a single lens reflex camera having a motion compensation device in accordance with embodiments of the present invention.

Reference will now be made in detail to the preferred embodiments of the present invention, examples of which are illustrated in the accompanying drawings wherein like reference numerals refer to the same or similar elements throughout.

A single lens reflex camera which utilizes a motion compensation device in accordance with embodiments of the present invention will be described first below with reference to FIG. 1.

As shown in FIG. 1, the single lens reflex camera includes a lens barrel 2 attached to a camera body 1. The lens barrel 2 includes a photographic lens system comprising a first lens group 3, a second lens group 4 and a third lens group 5. The first lens group 3 is a fixed objective lens group and includes at least an objective lens. The second lens group 4 provides focus adjustment to form an image of a subject on an image forming plane 1a by moving the second lens group 4 in a direction of the optical axis I of the main optical system (the direction of arrow A in FIG. 1). The third lens group 5 (hereinafter referred to as a "motion compensation lens") compensates for image blur when moved in a direction perpendicular to the optical axis I (in a direction represented by arrow B in FIG. 1 and a direction perpendicular to the surface of FIG. 1).

Figure 2:
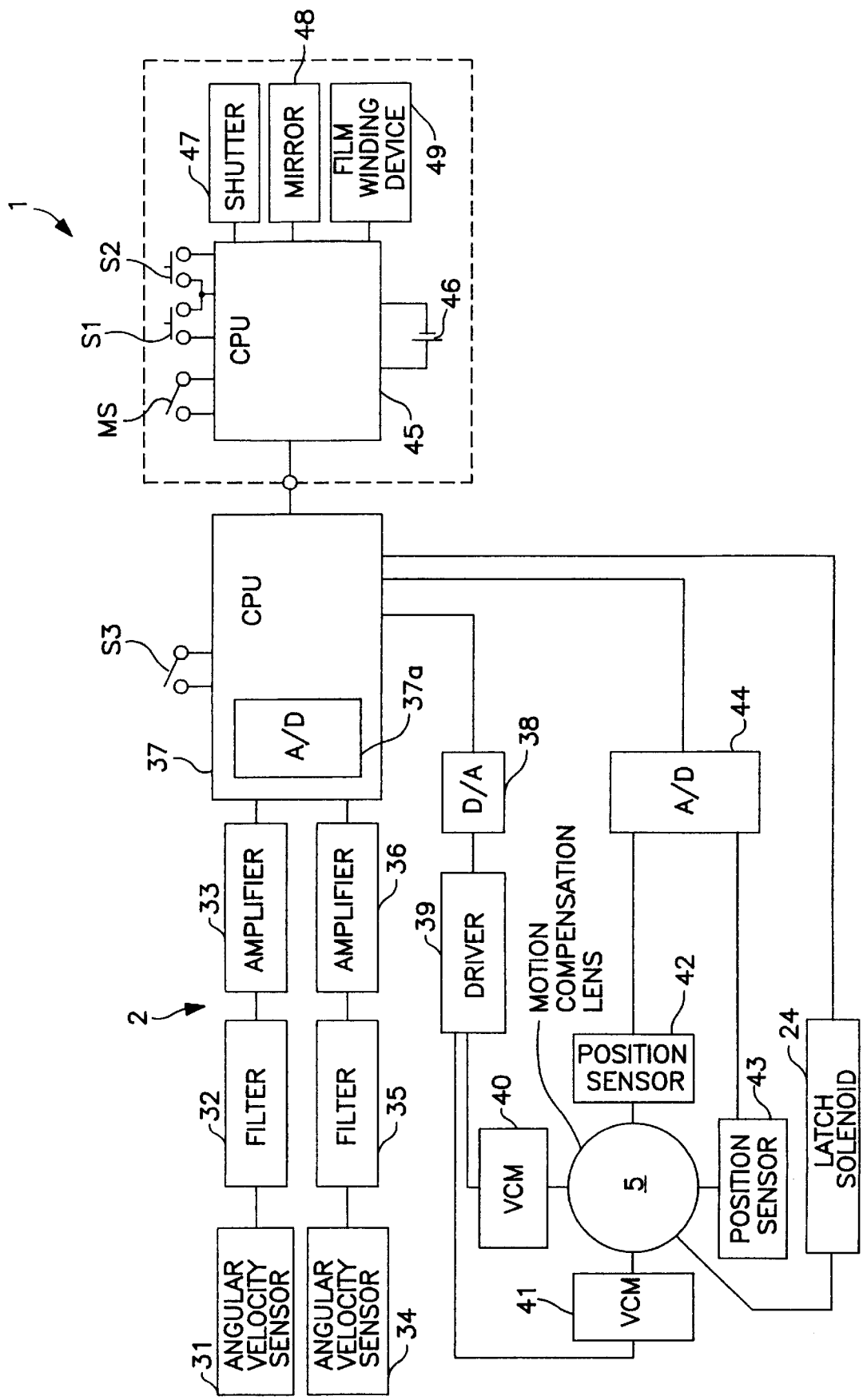
FIG. 2 is a block diagram of control circuitry for a motion compensation device in accordance with embodiments of the present invention.

FIG. 2 is a block diagram of the motion compensation device and control circuitry for the motion compensation device in accordance with embodiments of the present invention.

As shown in FIG. 2, the motion compensation device includes angular velocity sensors 31 and 34 for detecting motion, such as shake or vibration, of the camera body 1 or lens barrel 2 in both the vertical and horizontal directions. The outputs of the angular velocity sensors 31 and 34 are passed through filters 32 and 35, respectively, and then amplified by amplifiers 33 and 36, respectively. The outputs of amplifiers 33 and 36 are then input to a central processing unit CPU 37.

The CPU 37 provides various control signals to the lens barrel 2, such as control signals for driving and holding of the motion compensation lens 5 and for fastening of the motion compensation lens 5 using a latch solenoid 24, as will be described in detail hereinbelow. An A/D conversion of the signals entering the CPU 37 is performed by an internal A/D converter 37a, and then the CPU 37 executes specified processes to generate a motion compensation control signal. The motion compensation control signal from the CPU 37 is input to a D/A converter 38, and, after D/A conversion is performed by D/A converter 38, the output of the CPU 37 is input to a driver 39. The output of the driver 39 is then input to voice coil motors (VCMs) 40 and 41. The voice coil motors (VCMs) 40 and 41 are motors used to drive the motion compensation lens 5, and will be described in detail below with reference to FIG. 3.

Position sensors 42 and 43 detect the position of motion compensation lens 5. Signals indicating the positions detected by position sensors 42 and 43 are fed back to the CPU 37 after A/D conversion by an A/D converter 44.

A latch solenoid 24 is operatively coupled to the CPU 37 and to the motion compensation lens 5. The latch solenoid 25 is used to fasten the motion compensation lens 5 at a specified position. A switch S3 connected to the CPU 37 detects fastening of the motion compensation lens 5 with the latch solenoid 24.

The camera body 1 includes a central processing unit CPU 45 to provide various controls for the entire camera. Further, the camera body CPU 45 communicates with the lens barrel CPU 37 to transfer information to and receive information from the lens barrel 2. The CPU 45 is also connected to and communicates with other camera elements including a power supply cell 46; a main switch (power supply switch) MS; a half-push switch S1 which is switched on by depressing a shutter release button (not shown) halfway; a full-push switch S2 which is switched on by fully depressing the shutter release button; a shutter 47; a mirror 48; and a film winding device 49.

A drive device for driving the motion compensation lens 5 will now be described with reference to FIGS. 3–5.

Figure 3:
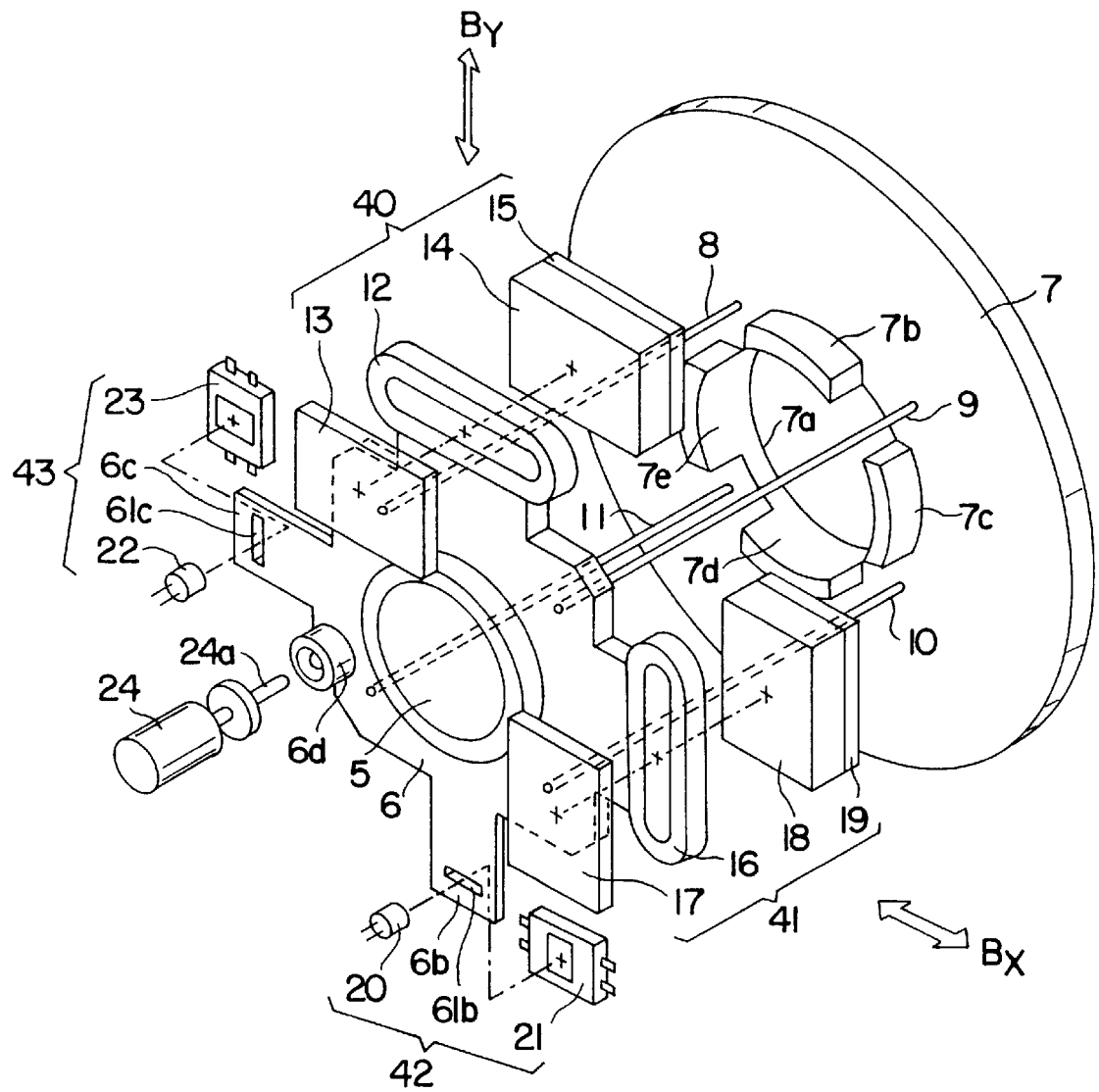
FIG. 3 is a perspective view of a drive mechanism for driving a motion compensation optical system of the motion compensation device in accordance with embodiments of the present invention.

FIG. 3 is a perspective view of a drive device for driving the motion compensation lens 5 in the motion compensation device in accordance with embodiments of the present invention. FIG. 4 is a cross sectional view of the motion compensation lens 5 and the latch solenoid 24 in a state wherein the latch solenoid 24 has released the fastening of the motion compensation lens 5. FIG. 5 is a cross sectional view of the motion compensation lens 5 in a state wherein the latch solenoid 24 fastens the motion compensation lens 5 such that the motion compensation lens 5 is immobilized.

Figure 4:
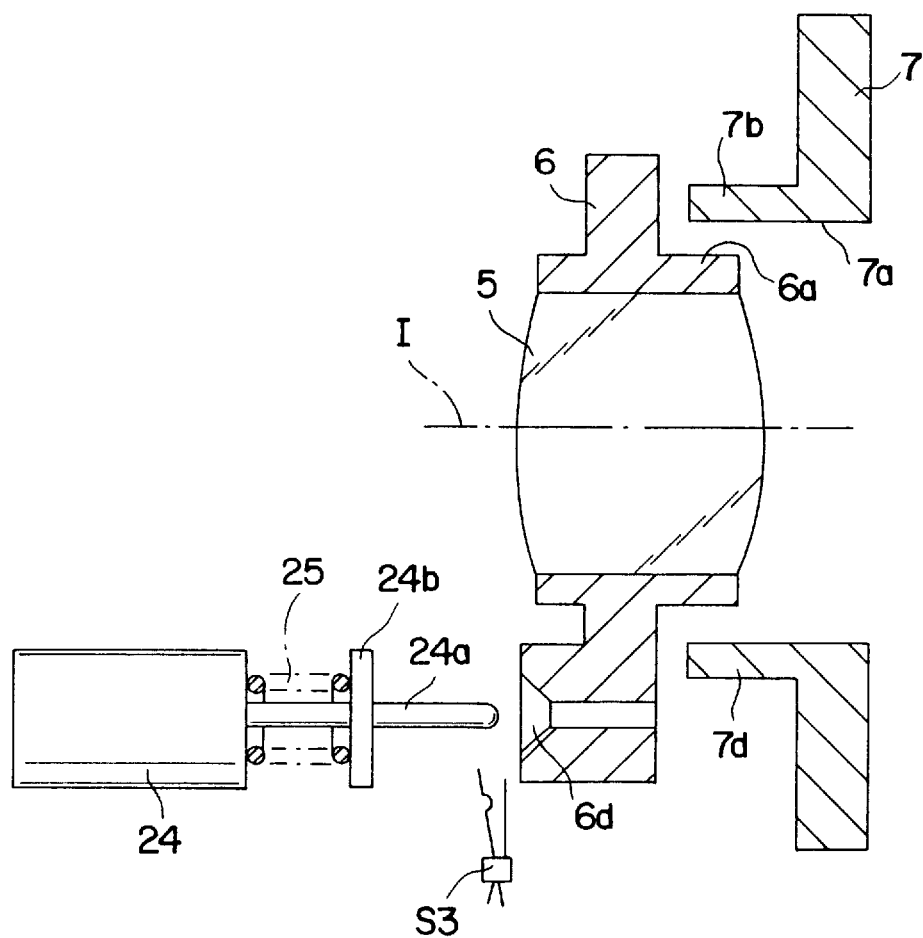
FIG. 4 is a cross sectional view of the motion compensation optical system in a state where a latch solenoid releases fastening of the motion compensation lens in accordance with embodiments of the present invention.
Figure 5:
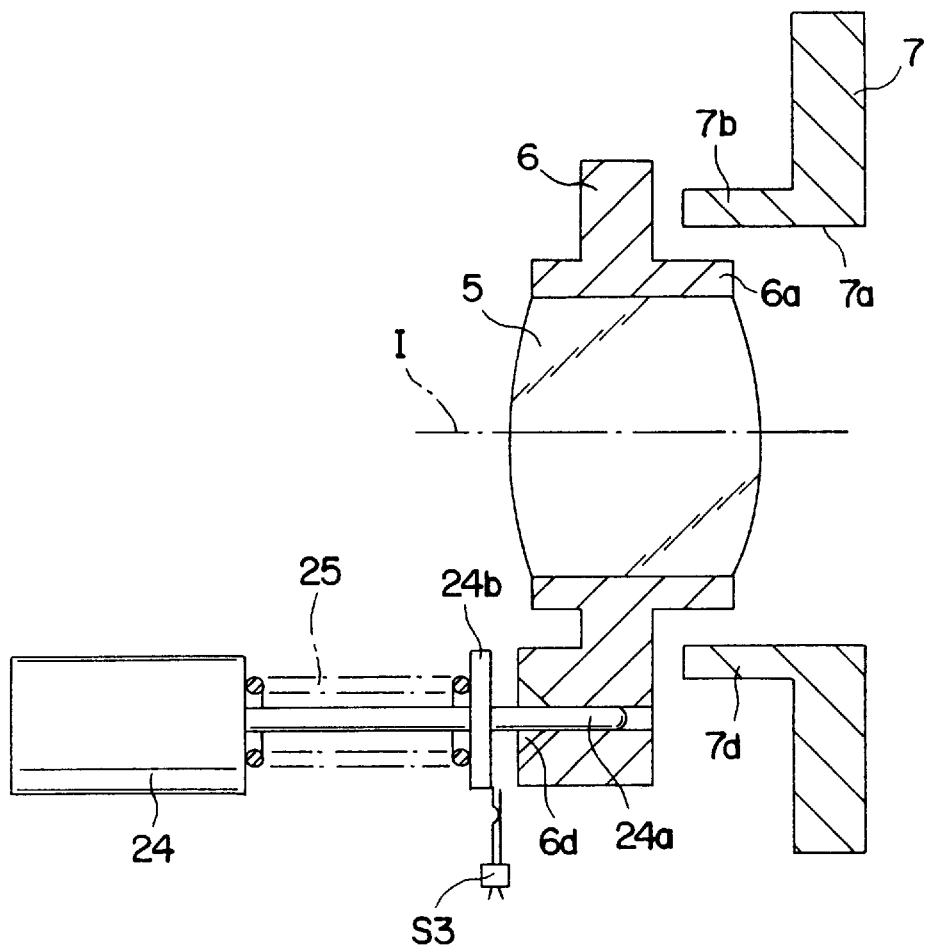
FIG. 5 is a cross sectional view of the motion compensation optical system in a state where the latch solenoid fastens the motion compensation optical system in accordance with embodiments of the present invention.

As shown in FIGS. 3–5, a lens frame 6 holds the motion compensation lens 5. As shown in FIGS. 4 and 5, the lens frame 6 includes a flange 6a formed in an area where the motion compensation lens 5 is held by the lens frame 6. Further, as shown in FIG. 3, slit areas 6b and 6c are formed in the lens frame 6 for position sensors 42 and 43, and a fitting area 6d is formed in the lens frame 6 to accommodate a plunger 24a of the latch solenoid 24. Furthermore, coils 12 and 16 of the voice coil motors 40 and 41, respectively, are attached to the lens frame 6.

Support members 8, 9, 10 and 11 elastically support the lens frame 6 on a base member 7. One end of each support member 8, 9, 10 and 11 is fixed to the lens frame 6, and the opposite ends of support members 8, 9, 10 and 11 are fixed to the base 7. Support members 8, 9, 10 and 11 comprise a wire-like member or a spring-like member.

Yokes 15 and 19 of voice coil motors 40 and 41, respectively, are installed on the base member 7, as will be explained in more detail below. Further, photo sensors (PSD) 21 and 23 of position sensors 42 and 43, respectively, are also installed on the base member 7. Moreover, four wall elements 7b, 7c, 7d and 7e, which are curved corresponding to the circumference of the motion compensation lens 5, are formed around an opening in the base member 7.

As shown in FIGS. 4 and 5, the wall elements 7b, 7c, 7d and 7e are used for controlling the amount of the movement of lens frame 6 in the direction of optical axis I and in a direction that is perpendicular to optical axis I within a limited range. The opening in the base member 7 includes a flange 7a arranged such that the flange 7a is inside the wall elements 7b, 7c, 7d, and 7e.

As shown in FIG. 3, the voice coil motors 40 and 41 are used to apply a force to the lens frame 6 in the BY and BX directions, respectively, in order to drive the lens frame 6. Voice coil motors 40 and 41 are identical, except for the difference in the direction of the force applied to the lens frame 6. Accordingly, an explanation is provided only for the voice coil motor 40.

The voice coil motor 40 comprises a yoke 13 provided on a lid member (not shown) fixed to the base member 7 to cover the drive mechanism comprising voice coil motors 40 and 41. A permanent magnet 14 is attached to the yoke 15 and creates a magnetic field between the magnet 14 and the yoke 13. A coil 12 is positioned between the yoke 13 and the permanent magnet 14. When electrical current flows in the coil 12 in one direction, the motion compensation lens 5 is driven by a force in one direction of the arrow BY. When electrical current flows in the coil 12 in an opposite direction, the motion compensation lens 5 is driven by a force in the opposite direction of arrow BY. The lens frame 6 can thereby move a plane that is perpendicular or approximately perpendicular to the optical axis I.

Position sensors 42 and 43 detect the position of motion compensation lens 5 in the BY and BX directions, respectively. Position sensors 42 and 43 have identical configurations. The position sensor 42 comprises a light emitting element 20, such as an LED installed on a lid member (not shown), a photo sensor 21, and a slit 61b formed in a slit area 6b of the lens frame 6, and provided between the light emitting element 20 and the photo sensor 21. The light emitted from the light emitting element 20 passes through the slit 61b and reaches the photo sensor 21. If the slit 61b moves, the position of the light passing through the slit 61b and reaching the photo sensor 21 also moves. The variation in the position of the light reaching the photo sensor 21 changes the output signal of photo sensor 21, and the position of motion compensation lens 5 in the BY direction is detected according to the changes in the output signal of the photo sensor 21.

The position of the motion compensation lens 5 in the BX direction is detected in a manner similar to detecting the position of the motion compensation lens 5 in the BY direction.

The latch solenoid 24 is provided on the lid member (not shown) facing a fitting area 6d. Furthermore, the yokes 13 and 17 and light emitting elements 20 and 22 are also provided on the lid area.

As shown in FIGS. 4 and 5, the latch solenoid 24 comprises a plunger 24a which can be extended toward and retracted from the fitting area 6d, a flange 24b formed on the plunger 24a, and a spring 25 provided between the flange 24b and the main body of the latch solenoid 24 to apply a force to the plunger 24a toward the fitting area 6d (to the right side in FIG. 4). The fitting area 6d is a groove for holding the lens frame 6 as plunger 24a is inserted in the fitting area 6d. The entrance area of the fitting area 6d is formed in a cone shape, and the remainder of the fitting area 6d is cylindrical in shape.

Figure 6:
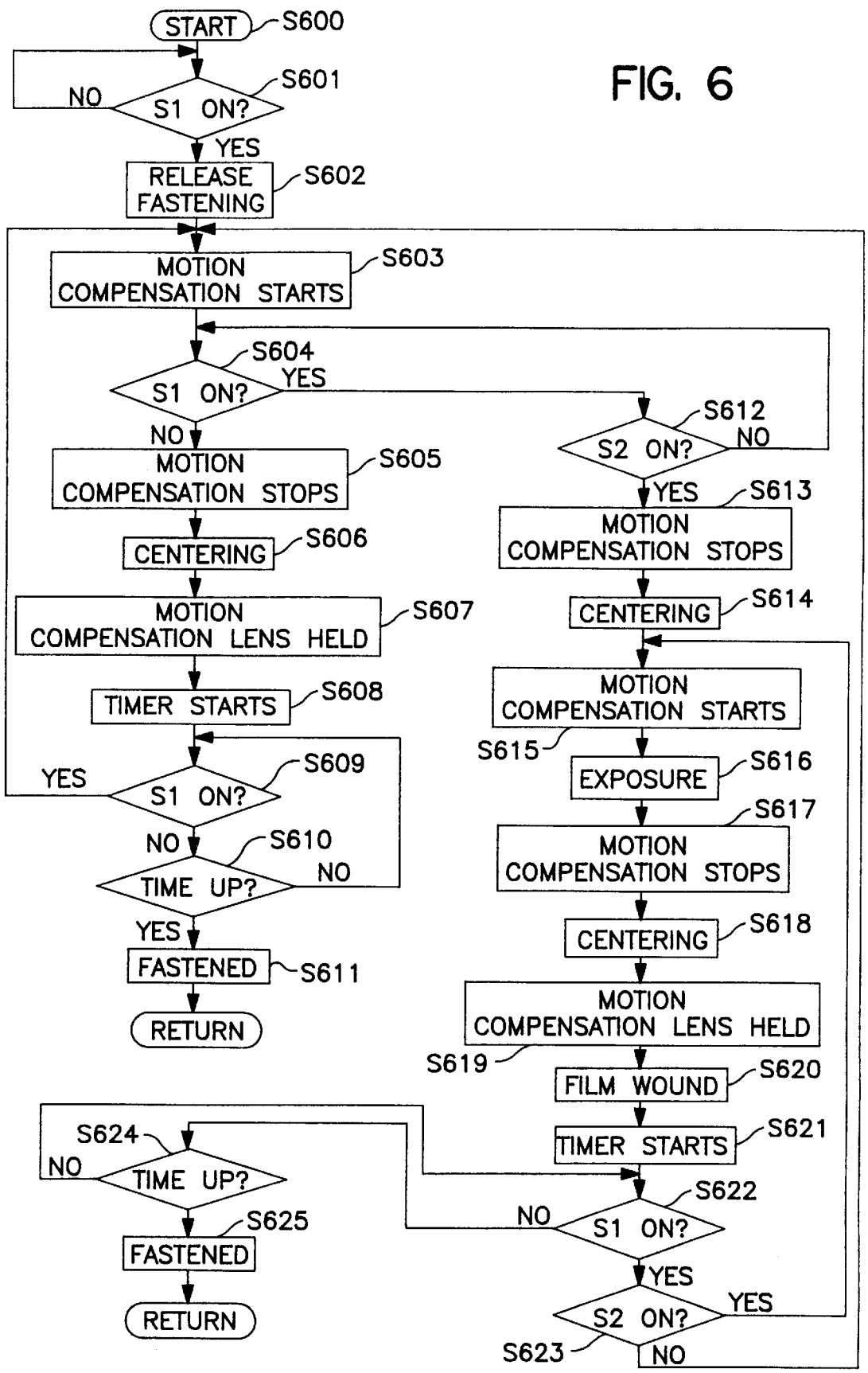
FIG. 6 is a flow chart showing an operational process for performing motion compensation with the motion compensation device in accordance with embodiments of the present invention.

The operation of the motion compensation device in accordance with embodiments of the present invention will now be described below with reference to the flowchart of FIG. 6, which illustrates an operational process for performing motion compensation with the motion compensation device in accordance with embodiments of the present invention.

First, in step S600, the CPUs 37 and 45 start the operational process when the CPU 45 supplies electrical power from the power supply cell 46 to the CPU 37 when the main switch MS is turned on. Next, in step S601, the CPU 45 determines whether or not the half-push switch S1 is on. If the half-push switch S1 is on, the operational process proceeds to step S602; however, if the half-push switch S1 is not on, the determination in step S601 is repeatedly performed until it is determined that the half-push switch S1 is on.

In step S602, the CPU 37 instructs the latch solenoid 24 to release the fastening of the lens frame 6. The CPU 37 applies electrical current to the latch solenoid 24, and the latch solenoid 24 supplies the electrical power to a permanent magnet inside the main body of the latch solenoid 24. The plunger 24a then moves to the left, as shown in FIG. 4, to release the fastening of the lens frame 6.

After the fastening of the lens frame 6 is released, the operational process continues in step S603, and the CPU 37 directs voice coil motors 40 and 41 to start the motion compensation process. The CPU 37 directs angular velocity sensors 31 and 34 to detect the motion, e.g., vibration, shake, etc.,of the camera body 1 and lens barrel 2 according to information from the CPU 45 indicating that half-push switch S1 is on. The angular velocity sensors 31 and 34 output motion detection information to the CPU 37, and the CPU 37 directs voice coil motors 40 and 41 to the drive lens frame 6 based on the motion detection information. Subsequently, motion compensation lens 5 begins the motion compensation process. The state of camera motion compensation can be observed through a viewfinder (not shown).

In step S604, the CPU 45 determines whether or not the half-push switch S1 remains on. If it is determined that the half-push switch S1 remains on, the operational process proceeds to step S612; however, if the half-push switch S1 is off, the operational process proceeds to step S605. In step S605, the CPU 37 instructs the voice coil motors 40 and 41 to stop the motion compensation process. Voice coil motors 40 and 41 then terminate the driving of the lens frame 6 based on the information that the half-push switch S1 is off.

Next, in step S606, the CPU 37 directs voice coil motors 40 and 41 to center the motion compensation lens 5. More particularly, based on the information that the half-push switch S1 is off, the voice coil motors 40 and 41 drive the motion compensation lens 5 (hereinafter referred to as "centering drive") so that the optical axis of the motion compensation lens 5 matches the approximate center position of the photographic optical system (hereinafter referred to as the "centering position").

Continuing in step S607, the CPU 37 directs the voice coil motors 40 and 41 to hold the motion compensation lens 5. In particular, the CPU 37 directs the voice coil motors 40 and 41 to hold the motion compensation lens 5 based on information from the CPU 45 indicating that the half-push switch S1 is off. The voice coil motors 40 and 41 hold the lens frame 6 at the centering position for a specified period of time. In step S608, the CPU 37 starts a timer based on the information from CPU 45 indicating that the half-push switch S1 is off. The timer starts counting a duration of time to hold the lens frame 6 at the centering position.

In step S609, the CPU 45 determines whether or not the half-push switch S1 is on. More specifically, in step S609, the CPU 45 determines whether or not the half-push switch S1 is switched on within the period of time set by the CPU 45 during which the lens frame 6 is held. If it is determined that the half-push switch S1 is on in step S609, the operational process returns to step S603. In step S603, the CPU 37 controls the voice coil motors 40 and 41 to again start the motion compensation process, including instructing the angular velocity sensors 31 and 34 to output the motion detection information, and instructing voice coil motors 40 and 41 to drive the lens frame 6 based on the motion detection information. Thus, the lens frame 6 can immediately resume the motion compensation operation from the centering position as soon as the half-push switch S1 is switched on.

If it is determined in step S609 that the half-push switch S1 is not on, the operational process proceeds to step S610. In step S610, the CPU 45 determines whether or not the time to hold the lens frame 6 has elapsed by determining whether or not the timer has reached a preset holding time, for example, two seconds. If the CPU 45 determines that the preset holding time has not elapsed, the operational process returns to step S609, and the step of determining whether or not the half-push switch S1 is switched on within the preset time is repeated. If the CPU 45 determines in step S610 that the preset holding time has elapsed, the operational process proceeds to step S611.

In step S611, the CPU 37 directs the latch solenoid 24 to fasten the lens frame 6. The CPU 37 fastens the latch solenoid 24 by applying an electrical current in a direction opposite to that applied when the latch solenoid 24 does not fasten the lens frame 6, thereby nullifying the permanent magnet inside the main body of latch solenoid 24. The plunger 24a then moves to the right, as shown in FIG. 5, and is fit into the fitting area 6d, thereby fastening the lens frame 6. The CPU 37 detects the fastening of the lens frame 6 and motion compensation lens 5 as the plunger 24a reaches the cylindrical area of the groove and the flange 24b turns the switch S3 on.

When the determination in step S604 indicates that the half-push switch S1 is on, the operational process proceeds to step S612 where the CPU 45 determines whether or not full-push switch S2 is on. If the full-push switch S2 is on, the operational process proceeds to step S613; however, if the full-push switch S2 is not on, the operational process returns to step S604 where the determination as to whether or not the half-push switch S1 is on is performed again.

In step S613, the CPU 37 directs the voice coil motors 40 and 41 to stop the motion compensation process. In particular, the CPU 37 instructs the voice coil motors 40 and 41 to stop the drive of the lens frame 6 based on information from CPU 45 indicating that the full-push switch S2 is on.

Continuing in step S614, the CPU 37 directs the voice coil motors 40 and 41 to center the motion compensation lens 5. The CPU 37 directs the voice coil motors 40 and 41 to execute the centering drive for the motion compensation lens 5 based on the information from CPU 45 indicating that the full-push switch S2 is on. In step S615, the CPU 37 directs the voice coil motors 40 and 41 to begin the motion compensation process. Specifically, the CPU 37 instructs the voice coil motors 40 and 41 to drive the lens frame 6 from the centering position based on the motion detection information from angular velocity sensors 31 and 34. The motion compensation lens 5 then begins the motion compensation process during exposure.

Next, in step S616, the CPU 45 begins control for the exposure operation. More specifically, while executing the motion compensation process, the CPU 45 starts a series of exposure related operations, such as the driving of the mirror 48 and operation of the shutter 47, based on the information that the full-push switch S2 is on.

In step S617, the CPU 37 directs the voice coil motors 40 and 41 to stop the motion compensation operation.

Specifically, the CPU 37 directs voice coil motors 40 and 41 to stop driving the lens frame 6 based on information indicating the completion of the exposure operation sent from the CPU 45. In step S618, the CPU 37 directs the voice coil motors 40 and 41 to perform centering, and voice coil motors 40 and 41 execute the centering drive. Proceeding to step S619, the CPU 37 directs the voice coil motors 40 and 41 to hold the lens frame 6 and motion compensation lens 5. The voice coil motors 40 and 41 then hold the lens frame 6 at the centering position for a specified period of time.

Continuing in step S620, the CPU 45 provides an instruction to the film winding device 49 to wind the film. The film winding device 49 starts winding the film in preparation for the next photographic action. In step S621, the CPU 45 initiates the timer to start counting the duration of time for holding the lens frame 6. In step S622, the CPU 45 determines whether or not half-push switch S1 is on. If the half-push switch S1 is switched on within the holding time, the operational process proceeds to step S623; however, if the half-push switch S1 is not switched on during the holding time, the operational process proceeds to step S624.

In step S623, the CPU 45 determines whether or not the full-push switch S2 is on. If the full-push switch S2 is on, the operational process returns to step S615; however, if full-push switch S2 is not switched on, the operational process proceeds to S603.

Thus, if the full-push switch S2 is determined to be on in step S623, in step S615, the CPU 37 directs the voice coil motors 40 and 41 to drive the lens frame 6 from the centering position based on the motion detection information from the angular velocity sensors 31 and 34. The motion compensation lens 5 thereby immediately resumes the motion compensation process. In step S616, the exposure process is executed again while the motion compensation process is performed.

Furthermore, if the full-push switch S2 is determined to be off in step S623, in step S603, the CPU 37 directs the voice coil motors 40 and 41 to drive the lens frame 6 from the centering position according to the motion detection information from angular velocity sensors 31 and 34. Subsequently, the motion compensation lens 5 immediately resumes the motion compensation process.

Finally, in step S624, the CPU 45 determines whether or not the preset holding time has elapsed by determining whether the timer has reached the preset holding time. If, in step S624, the CPU 45 determines that the preset holding time has not been reached, the operational process returns to step S622 to determine again whether or not the half-push switch S1 is switched on within the preset holding time. If the CPU 45 determines that the preset holding time has elapsed, the operational process proceeds to step S625 where the plunger 24a of latch solenoid 24 fastens the lens frame 6.

As described above, in accordance with the preferred embodiments of the present invention, the duration of time to hold the lens frame 6 at the centering position is preset by the timer in the CPU 45. The CPU 45 may determine the duration of the present holding time by storing in a memory the time required from the start of the timer until the half-push switch S1 is switched on by a photographer at all times, or for a predetermined number of times, and obtaining a mean time from these stored values. If the holding time is set in this manner, the period of time during which the voice coil motors 40 and 41 hold the lens frame 6 at the centering position may be set to coincide with the time when a photographer switches on the half-push switch S1. Consequently, the power consumption by the voice coil motors 40 and 41 necessary for holding lens frame 6 can be reduced.

Furthermore, it is possible to set the holding time at a time selected according to the photographer's preference. For example, the timer of the CPU 45 may be randomly set and the set time may be stored in memory.

In accordance with embodiments of the present invention, when the motion compensation process is performed again immediately after the completion, or interruption, of a motion compensation process, time to release fastening of the lens frame by a fastening member is not required. Since lens frame 6 is held at the centering position for a specified period of time, the motion compensation lens 5 can immediately start the motion compensation process from the centering position when the half-push switch S1 is subsequently switched on.

Moreover, in accordance with embodiments of the present invention, the lens frame 6 is held at the centering position for a specified period of time after exposure, and is not immediately fastened by the fastening member. When the full-push switch S2 is subsequently switched on, the motion compensation lens 5 immediately begins the motion compensation process from the centering position, thereby enabling the ability to continue on to the next exposure action while executing camera motion compensation. As a result, the photographer will not miss a shutter release opportunity since no time is required to fasten and release the fastening of the lens frame 6 before another exposure process can be repeated following an exposure.

Furthermore, since the lens frame 6 is held at the centering position, the motion compensation lens 5 can be driven swiftly and faultlessly in either the BX or BY directions when executing the motion compensation process during exposure.

As described in detail above in accordance with embodiments of the present invention, the lens frame is held at a stand-by position for a specified period of time before the fastening of a motion compensation optical system begins, thereby enabling the ability to drive the motion compensation optical system immediately from the stand-by position when the motion compensation optical system is driven again.

In accordance with embodiments of the present invention, the motion compensation optical system can immediately perform the motion compensation process from the stand-by position when a motion compensation start signal is reentered while holding the motion compensation optical system at the stand-by position for a specified period of time.

In accordance with embodiments of the present invention, the motion compensation optical system can swiftly and faultlessly move in any direction from the approximate center of its drive range to provide motion compensation since the stand-by position is set at the approximate center of the drive range of the motion compensation optical system.

In accordance with embodiments of the present invention, the time for the drive member to hold the motion compensation optical system at the stand-by position is set as the mean time between the time of the entry of a motion compensation stop signal and the time of reentry of a motion compensation start signal. This holding time provides the optimum holding time that is in accordance with various conditions initiated by users.

In accordance with embodiments of the present invention, the duration of time for the drive member to hold the motion compensation optical system at the stand-by position can be set randomly. Therefore, it is possible to freely set the time for the drive member to hold the motion compensation optical system at the stand-by position based on the user's preferences.

In accordance with embodiments of the present invention, since the motion compensation start signal is generated based on at least one of the ON state of a photographing ready switch, and the ON state of a photographic operation switch, the drive member can drive the motion compensation optical system based on these signals so that the motion compensation optical system can immediately perform the motion compensation process.

In accordance with embodiments of the present invention, since the motion compensation stop signal is generated based on at least one of the OFF state of the photographic operation switch, the OFF state of the photographing ready switch or an exposure completion signal, the drive member can stop the motion compensation optical system based on these signals so that the motion compensation process can be interrupted.

Further, one of ordinary skill in the art will recognize that while the preferred embodiments have been shown and described as being used within an optical camera, they may be adapted for use in any device in which it is desirable to suppress blurring of an image formed by an optical system, for example, in camcorders, motion picture cameras, telescopes, binoculars, microscopes, range finding equipment, lasers, fiber optic communication systems, various optical projection systems and CD mastering systems.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A motion compensation device suitable for use in a camera, comprising:
   a motion detection device to detect motion and to output motion detection information;
   a motion compensation optical system to compensate for the detected motion;
   a drive member to drive the motion compensation optical system;
   a fastening member to fasten the motion compensation optical system;
   a motion compensation start signal generation device to generate a motion compensation start signal;
   a motion compensation stop signal generation device to generate a motion compensation stop signal; and
   a motion compensation control device to control the drive member to drive the motion compensation optical system according to the motion detection information in response to the motion compensation start signal, and to control the fastening member to fasten the motion compensation optical system in response to the motion compensation stop signal, wherein the motion compensation control device controls the drive member to sustain a stand-by position for a specified period of time until the fastening of the motion compensation optical system begins.

2. A motion compensation device as recited in claim 1, wherein the motion compensation control device controls the drive member to drive the motion compensation optical system from the stand-by position based on the motion detection information when the motion compensation start signal is re-entered within the specified period of time.

3. A motion compensation device as recited in claim 1, wherein the motion compensation control device sets an approximate center of a drive range of the motion compensation optical system as the stand-by position.

4. A motion compensation device as recited in claim 1, wherein the motion compensation control device sets the specified period of time as a mean time between the time when the motion compensation stop signal is entered and the time when the motion compensation start signal is re-entered.

5. A motion compensation device as recited in claim 1, wherein the motion compensation control device sets the specified period of time as an optional time.

6. A motion compensation device as recited in claim 1, wherein the motion compensation start signal generation device generates the motion compensation start signal based on at least one of an ON signal of a photographing ready switch and an ON signal of a photographic operation switch.

7. A motion compensation device as recited in claim 1, wherein the motion compensation stop signal generation device generates the motion compensation stop signal based on at least one of an OFF signal of the photographing ready switch, an OFF signal of the photographic operation switch, and an exposure completion signal.

8. A camera, comprising:
   a motion compensation system movable to compensate for camera motion;
   a fastening device to fasten the motion compensation system; and
   a control device to control the motion compensation system to stop a motion compensation operation and to remain at a specified position for a specified period of time after the motion compensation operation is stopped, and to control the fastening device to fasten the motion compensation system when the specified period of time has elapsed.

9. A camera as recited in claim 8, wherein the control device controls the motion compensation system to remain at an approximate center of the range of motion for the specified period of time.

10. A camera as recited in claim 8, wherein the control device sets the specified period of time as an optional time.

11. A camera as recited in claim 8, wherein the motion compensation system comprises:
    a motion compensation optical system which is movable to compensate for motion of the camera;
    a motion detection device to detect camera motion and to output motion detection information indicative of the detected motion; and
    a drive member to drive the motion compensation optical system according to the motion detection information, wherein the control device controls the drive device to hold the motion compensation optical system at the specified position for the specified period of time.

12. A camera as recited in claim 8, further comprising:
    a motion compensation start signal generation device to generate a motion compensation start signal to start a motion compensation operation;
    a motion compensation stop signal generation device to generate a motion compensation stop signal to stop a motion compensation operation,
    wherein the control device controls the motion compensation system to start motion compensation in response to the motion compensation start signal and to stop motion compensation in response to the motion compensation stop signal, and controls the fastening device to fasten the motion compensation system in response to the motion compensation stop signal after the specified period of time has elapsed, and controls the motion compensation system to resume motion compensation from the specified position in response to a motion compensation start signal received during the specified period of time.

13. A camera as recited in claim 12, wherein the control device sets the specified period of time as a mean time between the time when the motion compensation stop signal is received and the time when a motion compensation start signal is received thereafter.

14. A camera as recited in claim 12, wherein the motion compensation start signal generation device generates the motion compensation start signal based on at least one of an ON signal of a release button half-depression switch and an ON signal of a release button full-depression switch.

15. A camera as recited in claim 12, wherein the motion compensation stop signal generation device generates the motion compensation stop signal based on at least one of an OFF signal of the release button half-depression switch, an OFF signal of the release button full-depression switch, and an exposure completion signal.

16. A method of performing motion compensation in a camera by moving a motion compensation system comprising the steps of:

starting a motion compensation operation in response to a motion compensation start signal;

stopping the motion compensation operation in response to a motion compensation stop signal;

holding the motion compensation system at a specified position for a specified period of time in response to the motion compensation stop signal; and fastening the motion compensation system when the specified period of time elapses.

17. A method as recited in claim 16, wherein the step of holding the motion compensation system comprises:

centering the motion compensation system; and holding the motion compensation system at the centered position for the specified period of time.

18. A method as recited in claim 17, further comprising the steps of:

determining whether a motion compensation start signal is received during the specified period of time during which the motion compensation system is held; and starting a motion compensation operation from the centered position when a motion compensation start signal is received during the specified period of time.

\* \* \* \* \*